United States Patent
Karamanolis et al.

(10) Patent No.: US 7,171,494 B2
(45) Date of Patent: Jan. 30, 2007

(54) EXTENDING A STANDARD-BASED REMOTE FILE ACCESS PROTOCOL AND MAINTAINING COMPATIBILITY WITH A STANDARD PROTOCOL STACK

(75) Inventors: Christos Karamanolis, Sunnyvale, CA (US); Zheng Zhang, San Jose, CA (US); Mallik Mahalingam, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 846 days.

(21) Appl. No.: 09/774,841

(22) Filed: Jan. 31, 2001

(65) Prior Publication Data

US 2002/0103954 A1   Aug. 1, 2002

(51) Int. Cl.
*G06F 13/42* (2006.01)
(52) U.S. Cl. .................. 709/250; 709/203; 709/217; 709/218; 709/219; 710/105; 713/201
(58) Field of Classification Search ................ 709/203, 709/217–219, 250; 710/105; 713/201
See application file for complete search history.

(56) References Cited

U.S. PATENT DOCUMENTS

| 5,613,155 | A | * | 3/1997 | Baldiga et al. ............. 709/232 |
|---|---|---|---|---|
| 5,619,645 | A | * | 4/1997 | Montenegro et al. ......... 714/48 |
| 5,713,017 | A | * | 1/1998 | Lin et al. ...................... 707/8 |
| 5,828,876 | A | * | 10/1998 | Fish et al. ..................... 707/1 |
| 6,185,615 | B1 | * | 2/2001 | Labiaga et al. ............. 709/224 |
| 6,212,640 | B1 | * | 4/2001 | Abdelnur et al. ........... 713/201 |
| 6,356,863 | B1 | * | 3/2002 | Sayle ........................... 703/27 |
| 6,493,768 | B1 | * | 12/2002 | Boutcher .................... 719/330 |
| 6,654,794 | B1 | * | 11/2003 | French ....................... 709/217 |
| 6,826,613 | B1 | * | 11/2004 | Wang et al. ................. 709/227 |
| 2001/0032320 | A1 | * | 10/2001 | Abdelnur et al. ........... 713/201 |
| 2002/0083111 | A1 | * | 6/2002 | Row et al. .................. 709/203 |

* cited by examiner

*Primary Examiner*—David Wiley
*Assistant Examiner*—Alina Boutah (57) ABSTRACT

Apparatus and method for extending a standard-based remote file access protocol and maintaining compatibility with the standard protocol stack. Network file system (NFS) remote procedure calls (RPCs) that are submitted by an NFS client application are intercepted in a manner that is transparent to the client operating system. The intercepted NFS-RPCs are sent to a file interface card. The file interface card includes a processor that executes code that implements the standard NFS-RPC protocol, along with extensions to the standard NFS-RPC protocol. Non-NFS RPCs are sent to a conventional network interface card for processing.

12 Claims, 5 Drawing Sheets

EXTENDING A STANDARD-BASED REMOTE FILE ACCESS PROTOCOL AND MAINTAINING COMPATIBILITY WITH A STANDARD PROTOCOL STACK

FIELD OF THE INVENTION

The present invention generally relates to standards-based protocols, and more particularly to an arrangement and method for extending a standard-based protocol while maintaining compatibility with standard-based protocol stack.

BACKGROUND

The Network File System (NFS) is a standard network protocol that makes files stored on a file server accessible to any computer (client) on a network. The NFS client protocol provides access to files that reside on the remote server, in the same way as a client's local file system provides access to files that are stored on a local disk. NFS is transparent to client applications and exposes a traditional file system interface.

The NFS client protocol makes Remote Procedure Calls (RPCs) to the remote server in order to implement access to the files. The interface is implemented by the NFS protocol using RPCs. The RPC layer also provides methods for data representation that are independent of the host architecture. For example, when a client application needs to write to a file that resides in a remote server, it calls a generic write ( ) system call. The NFS client protocol implements the write ( ) call by invoking a request to the remote server via the RPC layer. RPC marshals the data and parameters of the write ( ) call in to a message and encodes the latter in an architecture independent format. The message is sent to the remote host via the TCP/IP protocol stack. It is delivered up by the TCP/IP stack of the server to the RPC layer, where it is unpacked and passed to the NFS server protocol. The NFS server protocol implements the write ( ) operation by accessing the server's local file system. A reply is sent back to the client through the NFS, RPC and TCP/IP protocol layers.

The RPC layer uses standard external data representation (XDR) for the information exchanged between different computer architectures. NFS on a file server provides a transparent, stateless access to shared data.

Improving the performance of a standard protocol such as NFS will often involve deviating from or extending the standard. In order to implement such improvements, both the client-side NFS protocol and the server-side NFS protocol may require enhancements. This creates hurdles for both vendors and potential customers of improved systems. While a vendor of an improved NFS-based file server could wait and hope that its extensions to the standard are adopted, the time and effort involved in changing standards along with rapidly changing market conditions, may render this approach unworkable.

A system and method that address the aforementioned problems, as well as other related problems, are therefore desirable.

SUMMARY OF THE INVENTION

In various embodiments, an apparatus and method are provided for extending a standard-based protocol while maintaining compatibility with the standard protocol stack. Network file system (NFS) remote procedure calls (RPCs) that are submitted by an NFS client application are intercepted in a manner that is transparent to the client operating system. The intercepted NFS-RPCs are sent to a file interface card. The file interface card includes a processor that executes code that implements the standard NFS-RPC protocol, along with extensions to the standard NFS-RPC protocol. Non-NFS RPCs are sent to a native (OS) communication protocol stack, and from the OS protocol stack the non-NFS RPCs are submitted to a conventional network interface card (NIC). The processor on the file interface card also provides TCP/IP, UDP and other protocol processing. Non-NFS RPCs are forwarded to a native protocol stack and are sent over a network via a conventional network interface card (NIC).

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments of the invention, an NFS client proxy interacts with NFS servers having extensions to the standard NFS protocol, and other system entities such as storage area network (SAN) devices, name servers and other server systems. The NFS client proxy is implemented on the extended file interface card (EFIC), which also runs a complete network stack, including the TCP/UDP stack and IP layer. By implementing the proprietary portion of the protocol on the interface card, performance is enhanced and the proprietary interactions are hidden from the standard NFS software on the client system. With the present invention, extensions that seek to improve performance, scalability, and fault-tolerance of distributed file systems, for example can be implemented in a manner that minimizes adaptation of the client system.

Figure 1:
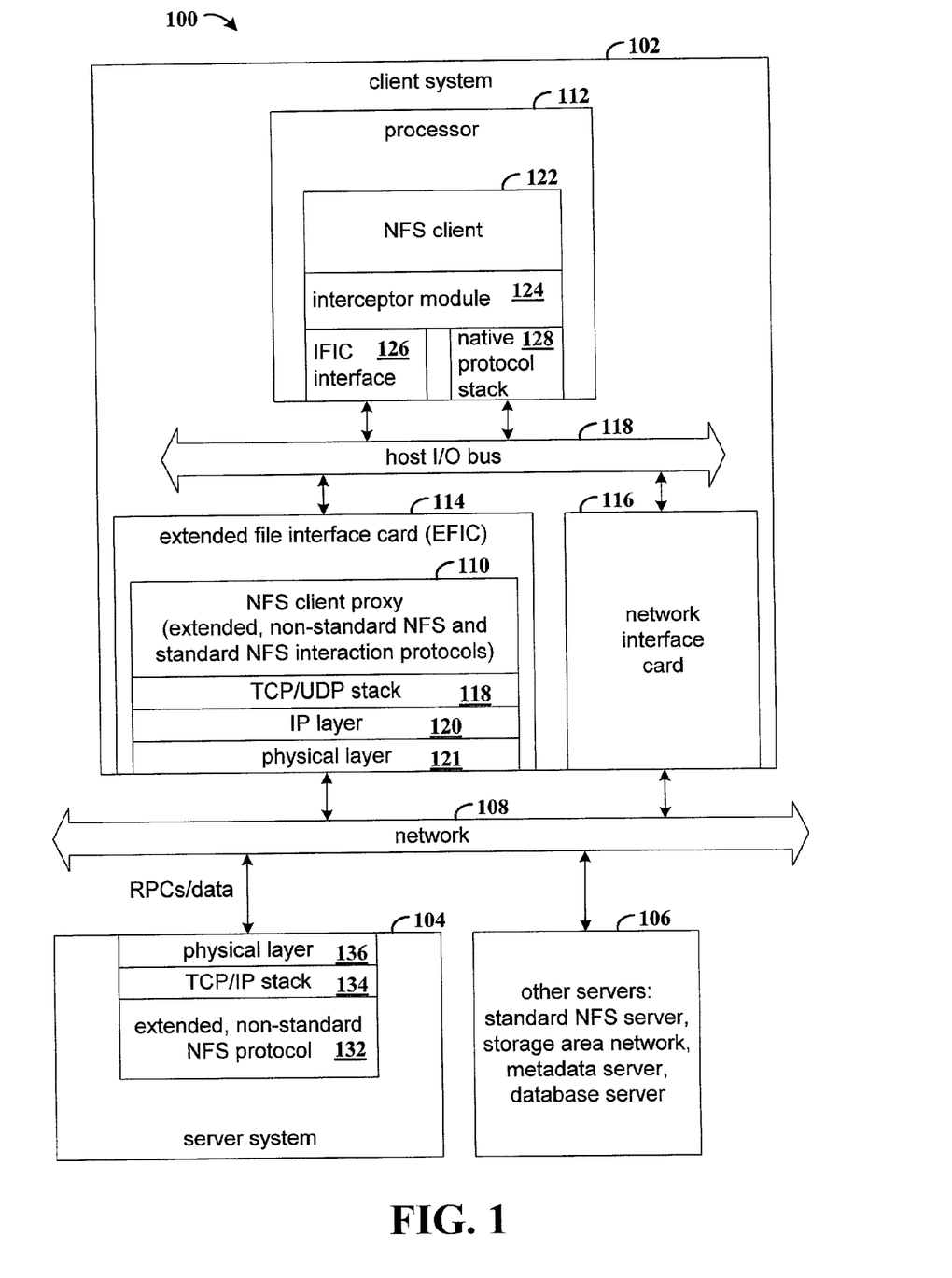
FIG. 1 is a functional block diagram of a system that includes an extended file interface card in accordance with one embodiment of the invention.

FIG. 1 is a functional block diagram of a system that includes an extended file interface card in accordance with one embodiment of the invention. System 100 includes a client data processing system 102 that is coupled to server systems 104 and 106 via a standard network 108. Server system 104 is a system that hosts an extended version of the standard NFS protocol, and block 106 represents one or more server systems with which the NFS client proxy 110 interacts. For example, the other types of servers include standard NFS servers, storage area network (SAN) devices, meta-data servers, name servers, or database servers.

Client system 102 includes a conventional processor 112 that is coupled to the extended file interface card (EFIC) 114 and a conventional network interface card 116 via the host I/O bus 118 (e.g., PCI bus). The NFS client proxy 110 is implemented on the EFIC 114, along with the standard TCP/UDP stack 118, IP layer 120, and physical layer 121. The NFS client proxy implements functional extensions added to the standard NFS protocol. Network interface card 116 provides a standard interface for client system 102 to the network 108. For example, network interface card 116 may be any one of a number of commercially available cards for connecting a Unix, Linux, NT, or Windows based machine to a network.

Processor 112 hosts software elements NFS client 122, interceptor module 124, EFIC interface 126, and native protocol stack 128. NFS client is an example client application that makes NFS-RPC calls. Interceptor module 124 is a software module that works in conjunction with EFIC 114. The function of interceptor module 124 is to intercept RPC calls, and depending on the particular procedure referenced, direct the call to either EFIC interface 126 or to native protocol stack 128 for processing. NFS-specific RPC calls are directed to EFIC interface 126, and other RPC calls are directed to native protocol stack 128. Two alternative implementations of interceptor module are described in FIGS. 2A and 2B, and in FIGS. 4 and 5. EFIC interface 126 forwards the extended NFS-RPC calls to EFIC 114, and network card interface forwards the other RPC calls to network interface card 116.

The upper layers of the standard NFS client protocol are implemented in the operating system kernel (not shown) of the client system. The upper layers of the NFS client protocol implement the generic file system operations, such as read ( ), write ( ), open( ), etc., and in some cases generate messages that are sent via the RPC layer. This functionality is implemented in the OS kernel and is not affected by interceptor module 124 or by the NFS client proxy 110.

The lower layers of the standard NFS client protocol, along with any extensions to the standard protocol, are implemented in the NFS client proxy element 110 on the EFIC 114. The lower layers include functionality that is related to the construction and transmission of NFS-specific RPC messages. For example, the lower layers control how the RPC messages (for NFS-read ( ), NFS-write ( ), etc.) are packed, encoded, and where the messages are sent over the TCP/IP stack. In different embodiments, the servers to which the RPC messages are sent and the interactions with the servers are extended in non-standard ways in the EFIC. For example, one RPC message submitted by the NFS client protocol may be interpreted and result in several other RPC and non-RPC messages being generated and sent to entities on the network such as meta-data servers, name servers, etc.

Server system 104 is an example data processing system that hosts extended, non-standard NFS protocol software 132. The extended NFS protocol software 132 interacts with NFS client proxy 110 in accordance with extended NFS protocols. The server system 104 also includes conventional TCP/IP stack 134 and physical layer 136 for interfacing with network 108.

By implementing the NFS-RPC services in the EFIC 114 instead of the operating system, legacy systems can be upgraded to take advantage of extensions to NFS by installation of the EFIC and accompanying interceptor module 124. The present invention also removes the burden of having to rebuild and reinstall the operating system kernel to upgrade the client system 102. Once the EFIC 114 is installed in the client system 102, further enhancements can be made to the client's NFS interface by downloading new software to the EFIC, rather than having to upgrade the client's operating system.

Figure 2A:
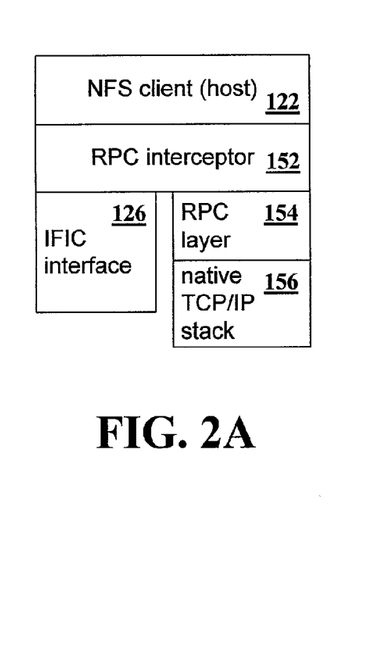
FIG. 2A illustrates the relationship between an RPC interceptor layer and other client software layers in accordance with an example embodiment of the invention.

FIG. 2A illustrates the relationship between an RPC interceptor layer and other client software layers in accordance with an example embodiment of the invention. The software elements 122, 126, 152, 154 and 156 are hosted by processor 112. RPC interceptor 152 is implemented as a software module that is plugged into the head of a stream queue (not shown) between the NFS and RPC stacks in the OS kernel. Some operating systems, for example, HP-UX, provide support for streams. Streams is a framework provided by operating systems to facilitate a modular configuration of system software, in terms of layers, where each layer conforms to a standardized interface. Streams provide a generic mechanism for passing data and control information between software layers. The RPC interceptor examines message headers of messages in the stream queue for NFS-specific RPCs. The NFS-specific RPCs are then presented to EFIC interface 126, which transmits the messages to the EFIC 114. It will be appreciated that with the RPC interceptor approach, all processing below NFS is off-loaded to the EFIC 114 for both standard and non-standard NFS RPCs.

For messages referencing other RPCs (non-NFS related), RPC interceptor 152 lets the message flow through to the native RPC layer 154. RPC layer 154 communicates with native TCP/IP stack 156 to send and receive messages over network 108 via network interface card 116.

Figure 2B:
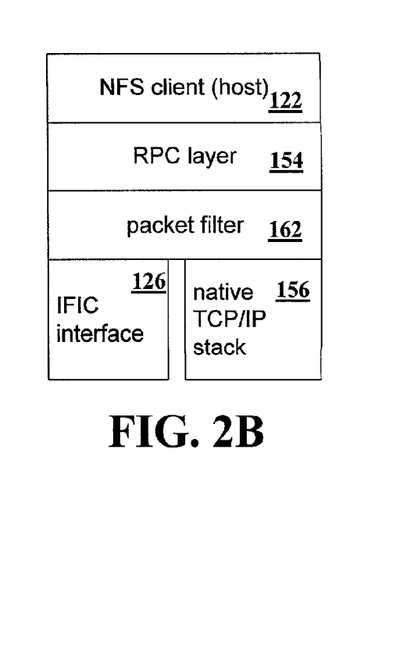
FIG. 2B illustrates the relationship between a packet filter layer and other client software layers in accordance with another embodiment of the invention.

FIG. 2B illustrates the relationship between a packet filter layer and other client software layers in accordance with another embodiment of the invention. Packet filter 162 is a software module that intercepts packets below the RPC layer 154 in the OS kernel. The RPC layer receives an out-bound message from the system software module above it, for example, the NFS client protocol, and marshals the data and control parameters of that message into a contiguous sequence of bytes. The marshaled message is encoded using XDR functions in a format that is independent of host architecture and is submitted to the TCP/IP (or UDP/IP) protocol stack for transmission. In addition, the RPC protocol is responsible for retransmission of the message if a reply is not received in a selected period of time, and is responsible for other functionality related to management of system resources, congestion control, etc. For in-bound messages delivered from the TCP/IP (or UDP/IP) stack, RPC decodes the message, un-marshals the contents, and delivers the message to the appropriate system module above (e.g. NFS). The packet filter 162 opens the RPC packet and examines the function code. If the function code references an NFS-specific RPC, the packet is directed to EFIC interface 126. Non-NFS RPCs are forwarded to the native TCP/IP stack 156.

The embodiment of FIG. 2A having the RPC interceptor offers the advantage over the embodiment of FIG. 2B having the packet filter of reduced computation costs. The packet filter embodiment requires opening a messages after it has been marshaled and encoded by the RPC layer, which is computationally expensive. In contrast the RPC interceptor examines the message prior to marshaling and encoding, thereby saving host processor cycles. It will be appreciated, however, that the RPC interceptor requires an operating system that supports streams.

Figure 3:
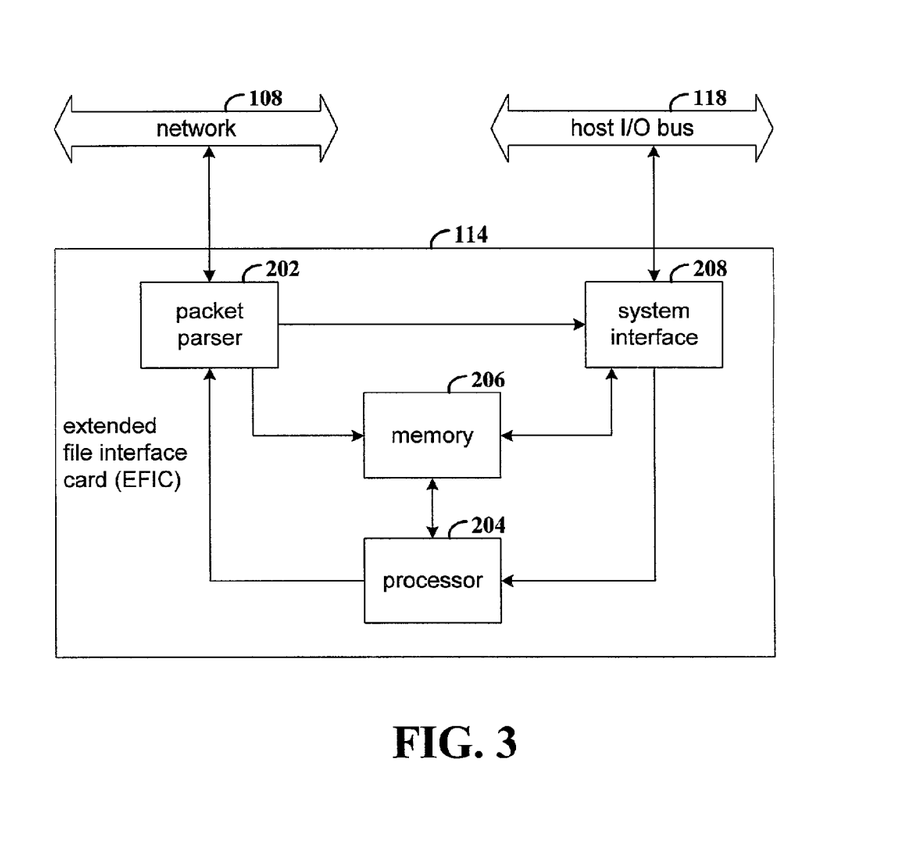
FIG. 3 is a functional block diagram of the extended file interface card according to one embodiment of the invention.

FIG. 3 is a functional block diagram of the extended file interface card according to one embodiment of the invention. EFIC 114 includes a packet parser 202, a processor 204, a memory 206, and a system interface 208. In operation, packet parser 202 interrogates a received information packet. The packet header is stored in memory 206 for further processing, and depending on the state of the protocol, the data portion of the packet is either also stored in memory 206 or sent to system interface 208. System interface 208 sends the data to the host processor for further processing.

Processor 204 is configured to interrogate the packet header information that is stored in memory 206 in accordance with one or more network protocol handling operations (e.g., firewall filtering, load balancing, and TPC/IP or RTP protocol handling operations). In addition, processor 204 is configured for protocol interactions as defined by the extensions to the NFS-RPC protocol.

System interface 208 includes, in one embodiment, a direct memory access (DMA) controller that is configured to arbitrate between EFIC 114, host memory (not shown, and other devices that perform DAM transfers over host I/O bus 118. Further details regarding an example implementation of EFIC 114 can be found in the application/patent entitled, "PROCESSING NETWORK PACKETS", by Russell et al., filed on Aug. 11, 2000, having application/patent No. 09/630,033, and assigned to the assignee of the present invention. The contents of the application/patent are incorporated herein by reference.

Figure 4:
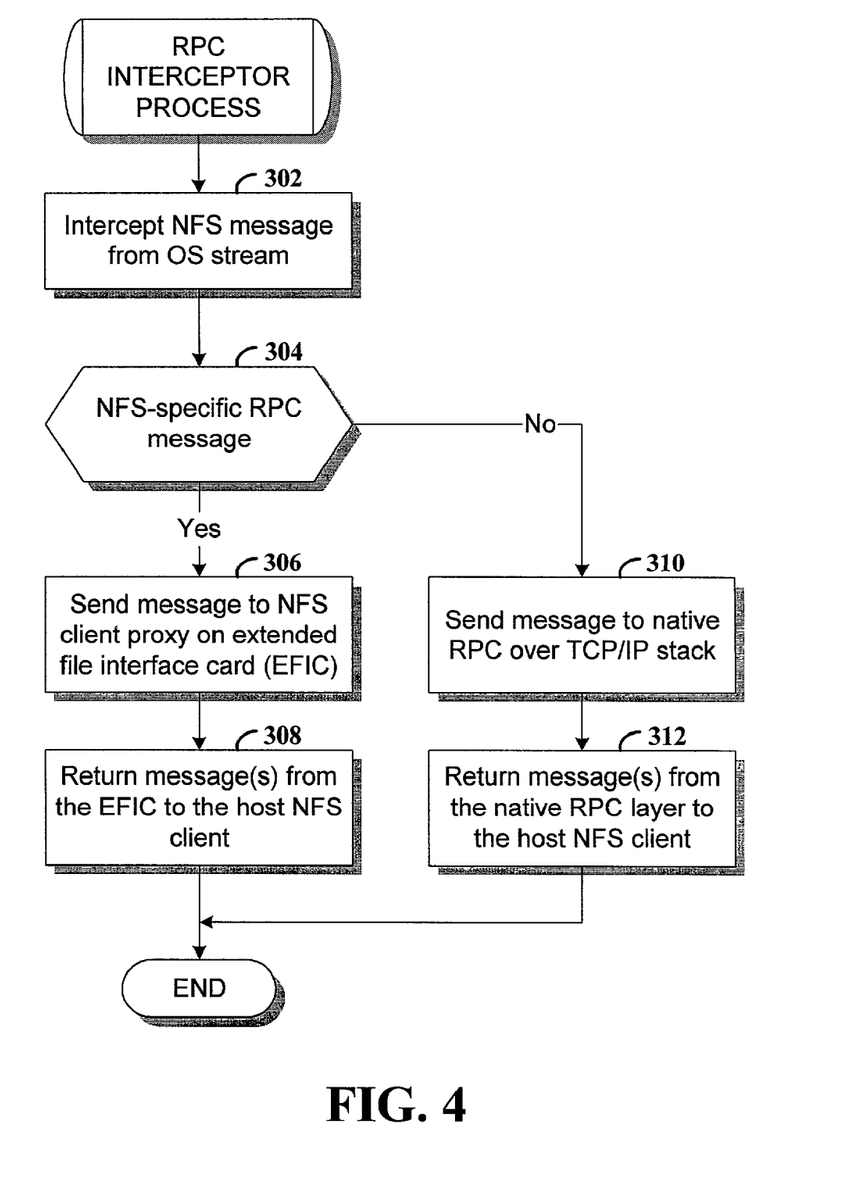
FIG. 4 is a flowchart of a process that implements the RPC interceptor layer of FIG. 2A.

FIG. 4 is a flowchart of a process that implements the RPC interceptor layer of FIG. 2A. The RPC interceptor intercepts messages at the head of the stream queue between the OS kernel NFS and RPC components. While the process of FIG. 4 illustrates the operations performed on only one message, those skilled in the art will appreciate that all the messages in the stream are intercepted and processed as described in the flowchart. At step 302, a message is intercepted from the stream. If the message is an NFS-specific RPC message, decision step 304 directs the process to step 306.

At step 306, the message is sent to the NFS client proxy on the EFIC 114. The client proxy performs on behalf of the host processor 112 the client-related NFS operations, as well as any non-standard extensions to the NFS operations. Messages returned from the client proxy are returned to the client application at step 308 to complete the process.

For non-NFS related messages, decision step 304 directs the process to step 310. Non-NFS messages are forwarded to the native RPC over TCP/IP stack for standard processing. At step 312, messages returned from the native RPC stack are returned to the NFS client.

Figure 5:
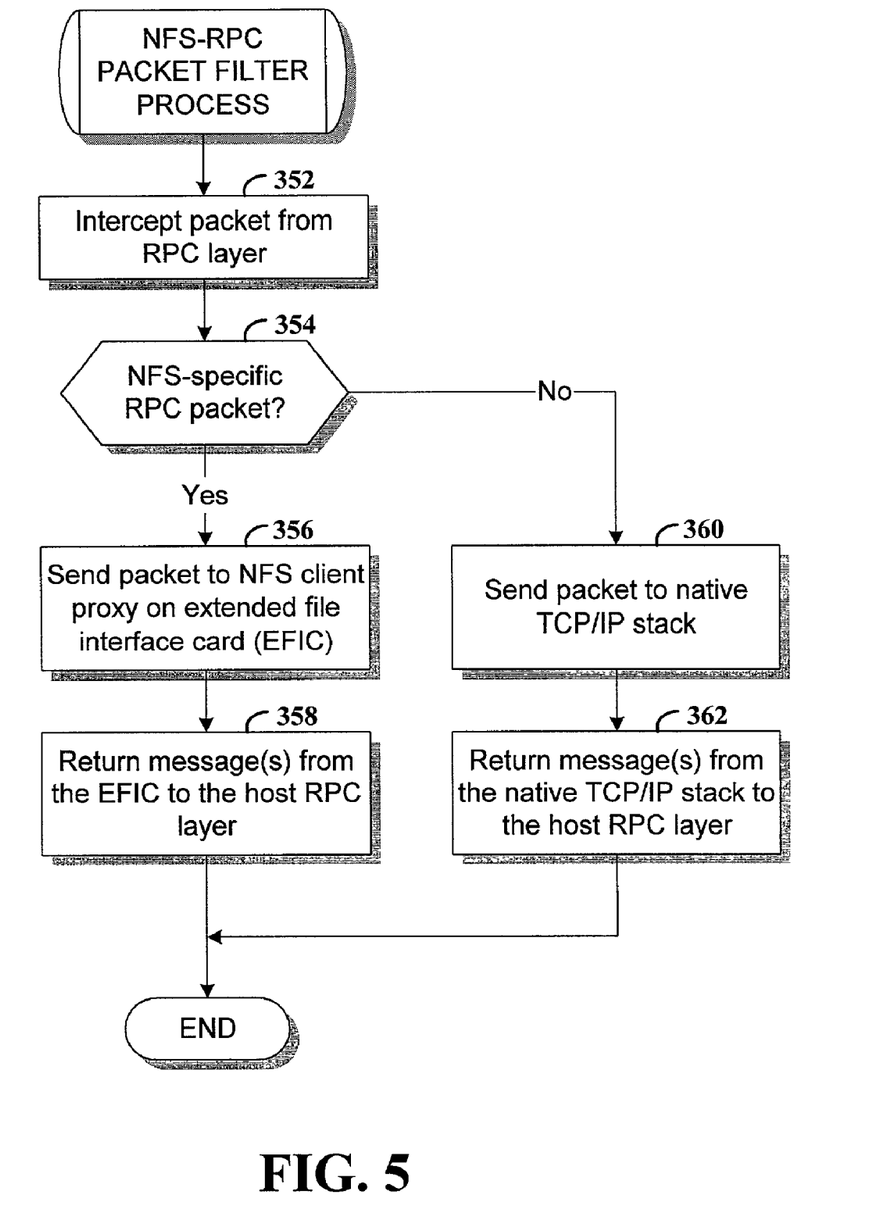
FIG. 5 is a flowchart of a process that implements the packet filter layer of FIG. 2B.

FIG. 5 is a flowchart of a process that implements the packet filter layer of FIG. 2B. The NFS-RPC packet filter intercepts RPC packets below the NFS-RPC elements of the operating system kernel. While the process of FIG. 5 illustrates the operations performed on only one packet, those skilled in the art will appreciate that all the packets from the RPC layer are intercepted and processed as described in the flowchart. At step 352, a packet is intercepted from the RPC layer. If the function code in the RPC packet NFS-specific, decision step 354 directs the process to step 356.

At step 356, the message is sent to the NFS client proxy on the EFIC 114. The client proxy performs on behalf of the host processor 112 the client-related NFS operations, as well as any non-standard extensions to the NFS operations. Messages returned from the client proxy are returned to the client application at step 358 to complete the process.

For non-NFS related RPC packets, decision step 354 directs the process to step 360. Non-NFS RPC packets are forwarded to the native TCP/IP stack for standard processing. At step 362, messages returned from the native TCP/IP stack are returned to the NFS client.

Figure 6:
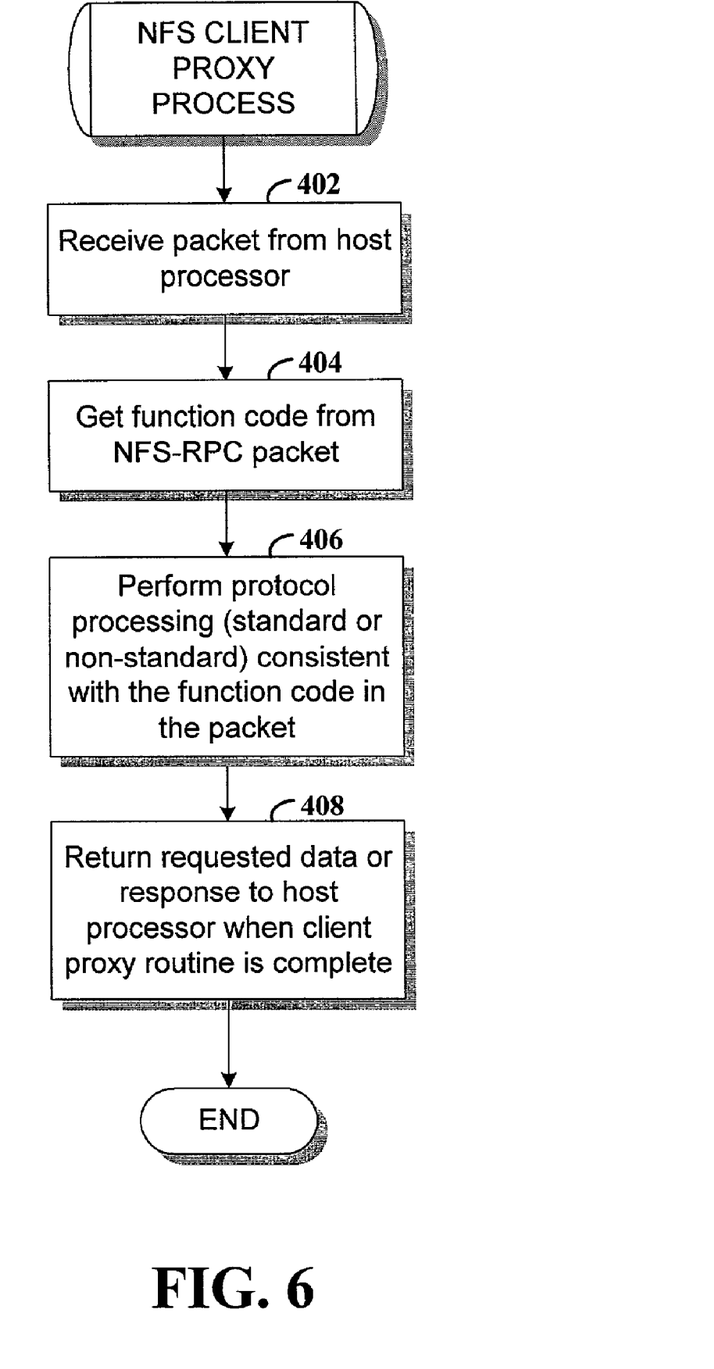
FIG. 6 is a flowchart of a process that implements an NFS client proxy according to one embodiment of the invention.

FIG. 6 is a flowchart of a process that implements an NFS client proxy according to one embodiment of the invention. The NFS client proxy 110 processes NFS-specific RPC requests on behalf of the client operating system kernel, thereby off-loading RPC processing from the host processor and supporting extensions to the standard NFS protocols.

At step 402, the NFS client proxy receives a packet from the interceptor module 124. The function code is obtained from the NFS-RPC packet at step 404. The function code dictates the protocol by which the NFS client proxy will interact with the addressed server system. At step 406, the NFS client proxy performs the protocol processing dictated by the function code in the packet. For example, for standard NFS functions (functions that have not been extended), the NFS client proxy interacts with the server in a manner consistent with the standard. For extended NFS functions (non-standard), the NFS client proxy interacts with the server in the manner defined by the extended function.

When the NFS client proxy reaches a state in the interaction with the server system where the protocol specifies, the data or response is returned to the host processor, as shown by step 408. The client proxy repeats this general process for each NFS-RPC packet received from the host processor.

The present invention is believed to be applicable to a variety of computer system architectures and with a variety of operating systems. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A file interface arrangement for providing remote file access to a data processing system via a network, the data processing system including a first processor arrangement coupled to a system input/output bus, and a network interface card that is a first card coupled to the system input/output bus, wherein the first processor arrangement of the data processing system executes an operating system and a network file system (NFS) client application, the file interface arrangement comprising:

a file interface card that is a second card;

a bus-interface circuit disposed on the file interface card and arranged to interface with the system input/output bus;

a second processor arrangement disposed on the file interface card and coupled to the bus-interface circuit;

a memory disposed on the file interface card and coupled to the second processor arrangement, the memory configured with program code that is executable by the second processor arrangement and that implements a standard NFS client protocol, at least one non-standard extension to the NFS client protocol, and a network protocol stack;

an interceptor module executing on the first processor arrangement and coupled to the operating system and to the system bus, the interceptor module configured and arranged to intercept NFS-client remote procedure calls from the NES client application and send NES-client remote procedure calls to the second processor arrangement via the system bus and send remote procedure calls that are not NFS calls to the network interface card; and a network-interface circuit arrangement disposed on the file interface card and coupled to the second processor arrangement and arranged to send data received from the second processor arrangement over the network and receive data via the network.

2. The arrangement of claim 1, wherein the operating system includes a message stream and the interceptor module is configured and arranged to intercept NFS messages from a message stream of the operating system.

3. The interface arrangement of claim 2, wherein at least one non-standard extension to the NFS client protocol includes an interface to one or more of a storage area network, a database system, a name server, or a meta-data server.

4. The arrangement of claim 1, wherein the operating system includes an RPC software layer, and the interceptor module is configured and arranged to intercept packets from the RPC layer of the operating system.

5. The interface arrangement of claim 4, wherein at least one non-standard extension to the NFS client protocol includes an interface to one or more of a storage area network, a database system, a name server, or a meta-data server.

6. The interface arrangement of claim 1, wherein at least one non-standard extension to the NFS client protocol includes an interface to one or more of a storage area network, a database system, a name server, or a meta-data server.

7. A data processing system, comprising:
a first processor configured to execute an operating system and an NFS client application;
a system input/output (I/O) bus coupled to the processor;
a network interface card coupled to the system I/O bus, the network interface card arranged to send data received from the first processor over a network and receive data via the network;
a file interface card coupled to the system I/O bus, wherein the file interface card implements a standard NFS client protocol responsive to the NFS client application executing on the first processor, at least one non-standard extension to the NFS client protocol, and a network protocol stack, and is adapted to send NFS requests over the network and receive NFS data via the network; and wherein the file interface card includes,
a bus-interface circuit arranged to interface with the system input/output bus:
a second processor coupled to the bus-interface circuit:
a memory coupled to the processor arrangement, the memory configured with program code that is executable by the second processor and that implements the standard NFS client protocol, each non-standard extension to the NES client protocol, and the network protocol stack; and
a network-interface circuit arrangement coupled to the processor arrangement and arranged to send data received from the second processor over the network and receive data via the network;
wherein the file interface card and the network interface card have respective connections to the system I/O bus; and
an interceptor module coupled to the operating system and to the system bus, the interceptor module configured and arranged to intercept NFS-client calls from the NFS client application and send NFS-client calls to the second processor via the system bus.

8. The system of claim 7, wherein the operating system includes a message stream and the interceptor module is configured and arranged to intercept NES messages from a message stream of the operating system.

9. The system of claim 8, wherein at least one non-standard extension to the NFS client protocol includes an interface to one or more of a storage area network, a database system, a name server, or a meta-data server.

10. The system of claim 7, wherein the operating system includes an RPC software layer, and the interceptor module is configured and arranged to intercept packets from the RPC layer of the operating system.

11. The system of claim 10, wherein at least one non-standard extension to the NES client protocol includes an interface to one or more of a storage area network, a database system, a name server, or a meta-data server.

12. The system of claim 7, wherein at least one non-standard extension to the NFS client protocol includes an interface to one or more of a storage area network, a database system, a name server, or a meta-data server.

* * * * *

UNITED STATES PATENT AND TRADEMARK OFFICE
CERTIFICATE OF CORRECTION

PATENT NO. : 7,171,494 B2  
APPLICATION NO. : 09/774841  
DATED : January 30, 2007  
INVENTOR(S) : Christos Karamanolis et al.

Page 1 of 1

It is certified that error appears in the above-identified patent and that said Letters Patent is hereby corrected as shown below:

In column 6, line 63, in Claim 1, delete "NES" and insert -- NFS --, therefor.

In column 6, line 63, in Claim 1, delete "NES-client" and insert -- NFS-client --, therefor.

In column 8, line 3, in Claim 7, after "bus" delete ":" and insert -- ; --, therefor.

In column 8, line 4, in Claim 7, after "circuit" delete ":" and insert -- ; --, therefor.

In column 8, line 9, in Claim 7, delete "NES" and insert -- NFS --, therefor.

In column 8, line 25, in Claim 8, delete "NES" and insert -- NFS --, therefor.

In column 8, line 36, in Claim 11, delete "NES" and insert -- NFS --, therefor.

Signed and Sealed this

Twenty-eighth Day of April, 2009

JOHN DOLL  
*Acting Director of the United States Patent and Trademark Office*